United States Patent [19]

Shimashita et al.

[11] Patent Number: 4,608,576

[45] Date of Patent: Aug. 26, 1986

[54] MULTI-PEN PLOTTER-PRINTER

[75] Inventors: Ishio Shimashita, Hatano; Yasuhiko Nishimura, Yokosuka, both of Japan

[73] Assignees: Ricoh Company, Ltd.; Ricoh Denshi Co., Ltd., both of Tokyo, Japan

[21] Appl. No.: 617,331

[22] Filed: Jun. 5, 1984

[30] Foreign Application Priority Data

| | | | |
|---|---|---|---|
| Jun. 15, 1983 | [JP] | Japan | 58-91278[U] |
| Jun. 15, 1983 | [JP] | Japan | 58-107344 |
| Jun. 15, 1983 | [JP] | Japan | 58-107345 |

[51] Int. Cl.[4] .......................... G01D 9/28; G01D 15/16

[52] U.S. Cl. .................................. 346/49; 346/139 R

[58] Field of Search ...................... 346/49, 139 R, 141, 346/139 A, 139 B, 139 C, 46

[56] References Cited

U.S. PATENT DOCUMENTS

| | | | |
|---|---|---|---|
| 4,157,652 | 6/1979 | Nakajima | 346/141 |
| 4,405,931 | 9/1983 | Fujisawa | 346/49 |

*Primary Examiner*—E. A. Goldberg
*Assistant Examiner*—Mark Reinhart
*Attorney, Agent, or Firm*—Cooper, Dunham, Clark, Griffin & Moran

[57] ABSTRACT

A plotter-printer includes a carriage assembly which is reciprocatingly movable along a platen, and the carriage assembly is comprised of a carriage main body, a plurality of pens movably mounted on the carriage main body in a predetermined pattern such that they are normally located at a retracted position where no printing takes place and selectively moved to an advanced position where printing takes place when actuated and at least one actuating lever pivotally supported on the carriage main body for selectively actuating the pens. In the preferred embodiment, the pens are arranged in a plurality of parallel rows which are spaced apart from one another in a direction normal to the direction of movement of the carriage assembly and a like plurality of actuating levers are provided, one for each of the rows.

17 Claims, 11 Drawing Figures

MULTI-PEN PLOTTER-PRINTER

BACKGROUND OF THE INVENTION

1. Field of the Invention

This invention relates generally to printers and particularly to plotter-printers capable of printing graphic information. More specifically, the present invention relates to plotter-printers including a plurality of pens, preferably different in color or kind, which are selectively used to print desired information, such as characters, graphs and pictures, on recording paper on a platen.

2. Description of the Prior Art

A plotter-printer capable of printing character information as well as graphic information is well known in the art. In such a plotter-printer, typically, a plurality of pens, such as ball-point pens, are provided with their front or ball-point ends directed toward and separated away from a platen on which recording paper is placed. Such a prior art plotter-printer is illustrated in FIG. 1. As shown, the illustrated plotter-printer includes a plurality of pens 2 arranged in two rows, top and bottom, along the longitudinal axis of platen. The plotter-printer also includes a like plurality of actuating levers 6 pivotally supported on a carriage 4 and a like plurality of solenoids 8 fixedly mounted on the carriage 4. Thus, for each of the pens 2, provision is made of a unique actuating lever 6 and a unique solenoid 8. With such a structure, however, if it is desired to provide the increased number of pens, the carriage 4 necessarily becomes larger in size and weight, which could cause a deterioration in printing quality and slow down the printing speed. Besides, the printer as a whole tends to become larger in size and weight.

SUMMARY OF THE INVENTION

It is therefore a primary object of the present invention to obviate the disadvantages of the prior art as described above and to provide an improved plotter-printer.

Another object of the present invention is to provide an improved plotter-printer smaller in the number of parts, small in size and light in weight.

A further object of the present invention is to provide a high-speed plotter-printer including a plurality of pens which are selectively used.

Other objects, advantages and novel features of the present invention will become apparent from the following detailed description of the invention when considered in conjunction with the accompanying drawings.

DESCRIPTION OF THE PREFERRED EMBODIMENTS

Figure 2:
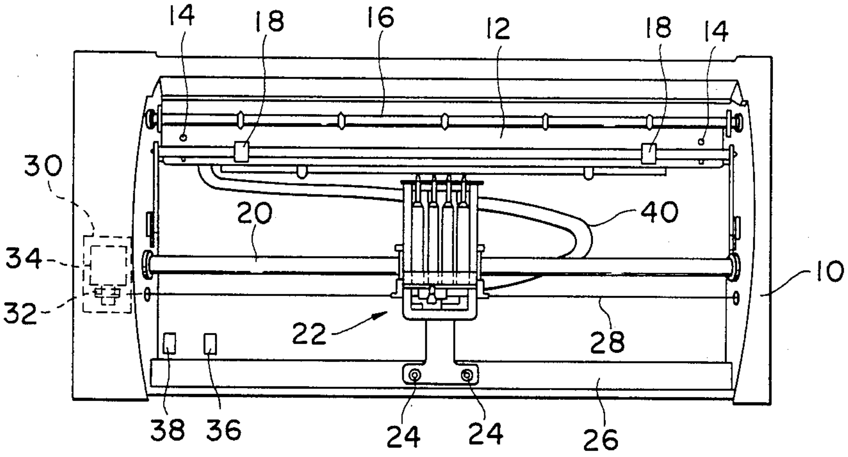
FIG. 2 is a plan view showing a plotter-printer constructed in accordance with one embodiment of the present invention.

Referring now to FIG. 2, there is shown a plotter-printer constructed in accordance with one embodiment of the present invention. As shown, the present plotter-printer includes a housing 10 in which a main body of the present plotter-printer is provided. A platen roller 12 is disposed in the rear side as rotatably supported by the housing 10. In the present embodiment, the platen roller 12 is provided with a plurality of sprockets 14 arranged circumferentially on both ends thereof. Although not shown specifically, there is also provided a driving mechanism for driving to rotate the platen roller in a desired direction as is obvious for one skilled in the art. It is to be noted, however, that the platen 12 may take any desired shape, e.g., flat plate, other than a roller and that the sprockets may be discarded, if desired.

In the illustrated embodiment, use may be made of a continuous sheet of paper or a cut sheet of paper alternatively as recording paper on which desired information is to be plotted or printed as placed on the platen roller 12. In the case of a continuous sheet of paper, sprocket holes are provided along each side of the sheet at a predetermined pitch such that they may come into engagement with the sprockets 14 of the platen roller 12. Thus, as the platen roller 12 is driven to rotate, the continuous sheet or recording paper moves in association therewith. Such a continuous sheet of paper is generally set around the platen roller 12 by pulling the leading edge from the rear side toward the front side under the platen roller 12 and then pulling it back toward the rear side over the platen roller 12, which is followed by placing a weight roller 16 on the platen roller 12 with the continuous sheet of paper sandwiched therebetween. On the other hand, if use is made of a cut sheet of paper, it is placed around the platen roller 12 by moving its leading edge from bottom to top when inserted from the rear side toward the front side, and then the weight roller 16 as well as pinch rollers 18, 18 are pressed against the platen roller 12 with the cut sheet of paper sandwiched therebetween. It is to be noted that in the present plotter-printer use may be made of plain paper, tracing paper, plastic film or any other suitable material as recording medium.

In the plotter-printer illustrated in FIG. 2, a guide shaft 20 is provided extending in parallel with the platen roller 12 and fixedly attached to the housing 10. As will be described further in detail, the guide shaft 20 extends through a carriage 22 so that the carriage may move along the platen roller 12 in a reciprocating manner. Described more in detail, the carriage 22 includes a tail end portion which is provided with a pair of magnets 24, 24 and which rests on a guide rail 26 extending in parallel with the guide shaft 20 as fixedly attached to the housing 10. Thus, the tail end portion of the carriage 22 is in sliding contact with the guide rail 26 as magnetically attracted thereto. In this manner, the carriage 22 moves along the platen roller 12 reciprocatingly as guided by the guide shaft 20 and guide rail 26. A driving wire 28 is also provided with its both ends fixedly attached to both sides of the carriage 22 and extending in parallel with the guide shaft 20 between a pair of pulleys (only one of them is shown as 32 in FIG. 2). As shown by the dotted line in FIG. 2, the plotter-printer includes a carriage driving mechanism 30 which is comprised of a pulley 32 around which the wire 28 wound and a pulse motor 34 for driving to rotate the pulley 32. With this structure, when the pulse motor 34 is driven to rotate the pulley 32, the wire 28 is pulled in a selected direction thereby causing to move the carriage 22 along the platen roller 12 as guided by the guide shaft 20.

Also provided in the plotter-printer of FIG. 2 is a home position sensor 36 for detecting the condition that the carriage 22 is in home position. To the left of the home position sensor 36 is provided a left margin sensor 38 for detecting the condition that the carriage 22 is located at the leftmost position. A flexible interconnection cable 40 is also provided as connected between the carriage 22 and a print control unit (not shown) which is also provided in the housing 10.

Figure 3:
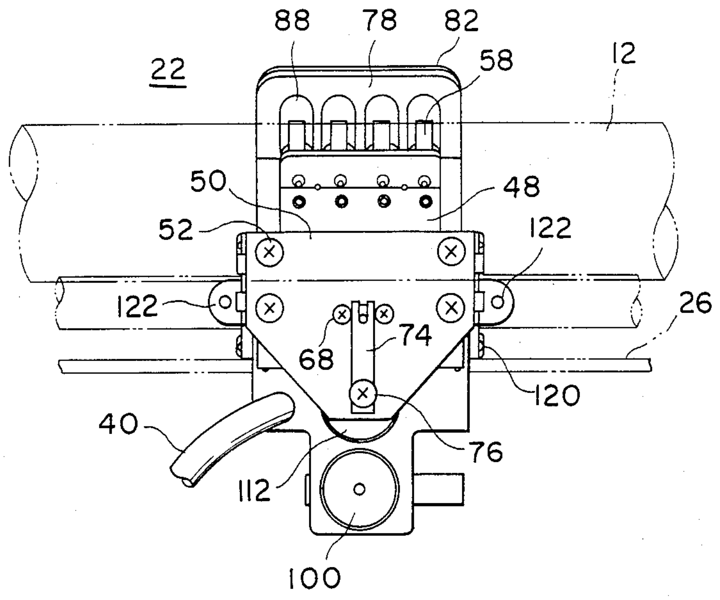
FIGS. 3–6 are schematic illustrations showing different structural aspects of the carriage 22 provided in the plotter-printer of FIG. 2.
Figure 4:
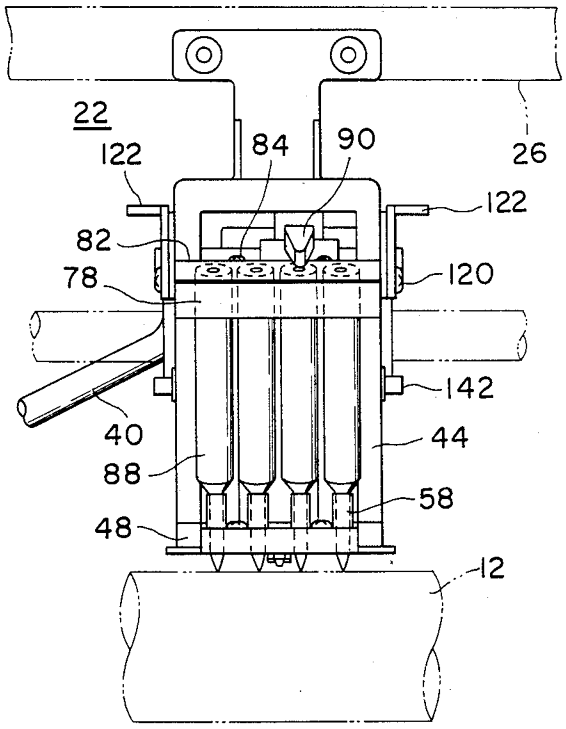
Figure 5:
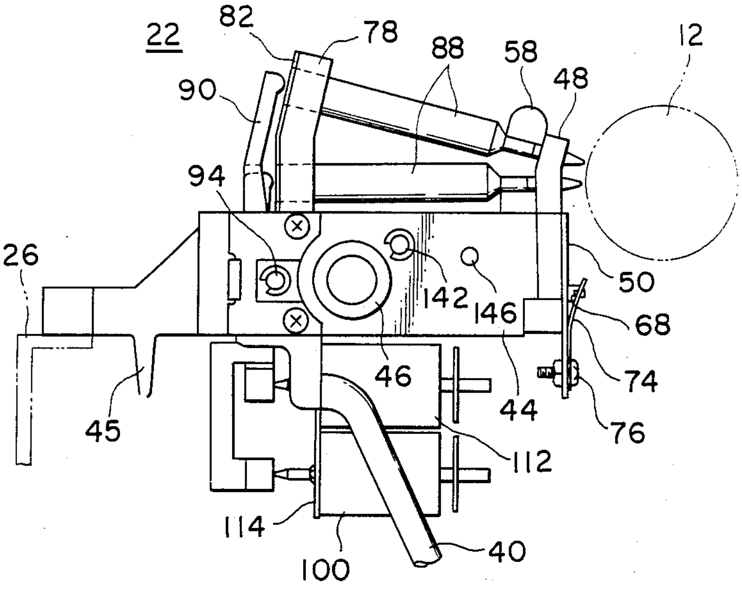
Figure 6:
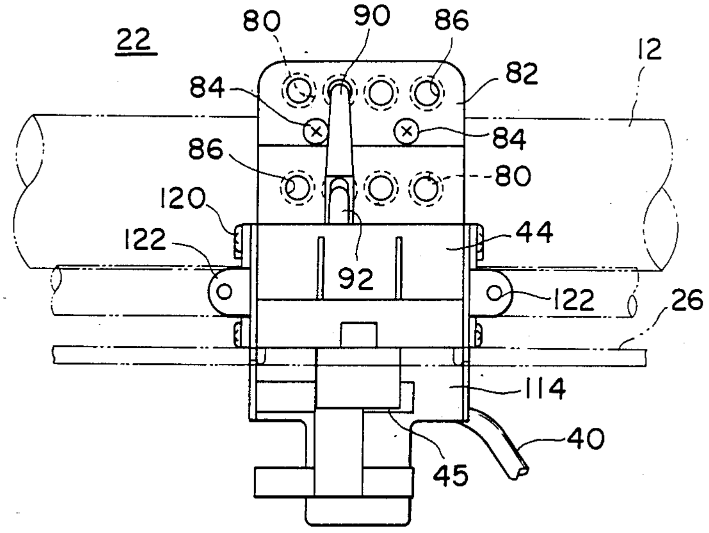
Figure 7:
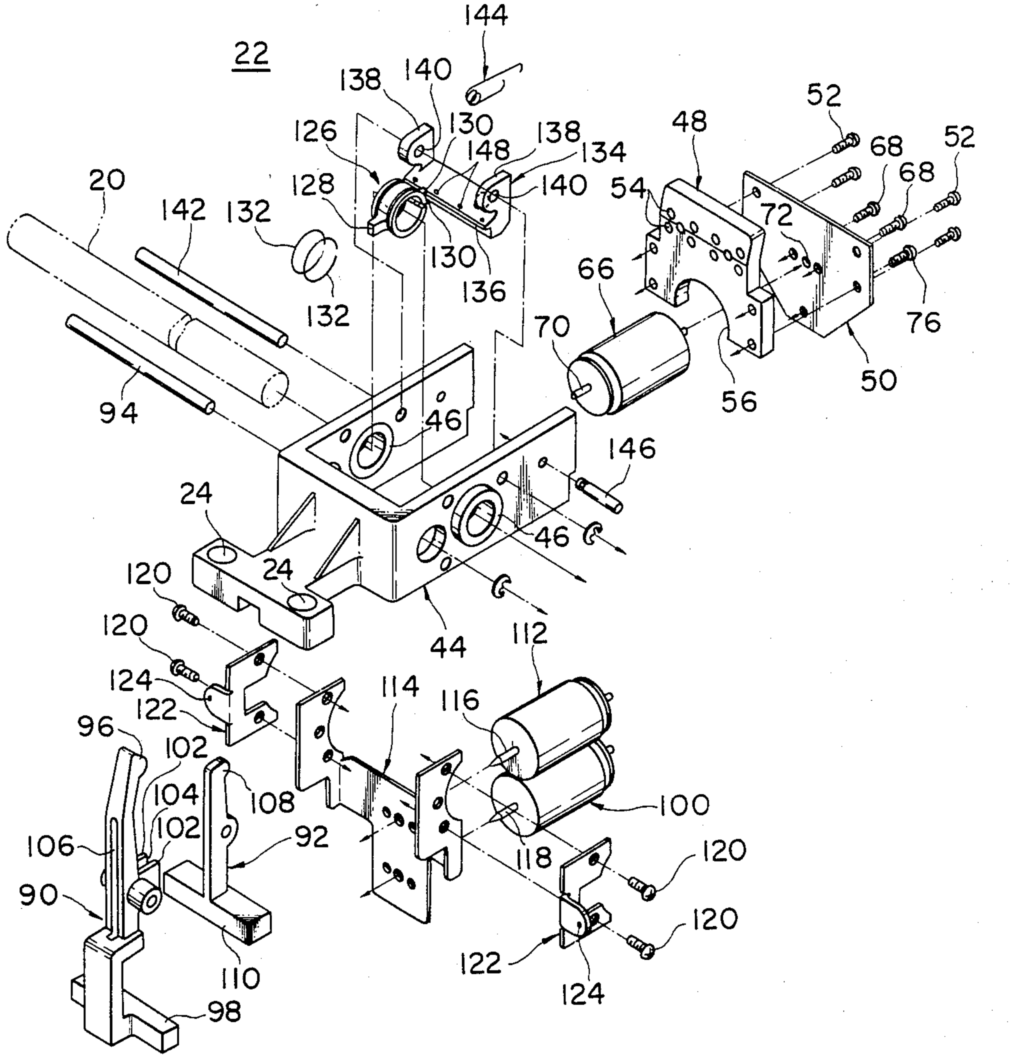
FIG. 7 is an exploded view of the carriage 22.

FIGS. 3 through 6 illustrate different structural aspects of the carriage 22 provided in the present plotter-printer of FIG. 2, in which FIG. 3 is a front view of the carriage 22, FIG. 4 is its plan view, FIG. 5 is its right-hand side elevational view and FIG. 6 is its rear view. FIG. 7 is an exploded view showing various parts which form the carriage 22 when assembled. The carriage 22 includes a generally U-shaped main body 44 having the before-mentioned tail end portion provided with the magnets 24, 24. As best shown in FIG. 5, there is provided a tongue 45 as extending downwardly from the bottom surface of the tail end portion. The tongue 45 is so located that it moves across the sensors 36 and 38 when the carriage 22 is driven to move along the platen roller 12 leftword thereby detecting that the carriage 22 is at the home and left margin positions, respectively. The carriage main body 44 is provided with a pair of holes each of which is fixedly provided with a ring-shaped bearing 46. The guide shaft 20 extends through the bearings 46, 46 so that the carriage 22 may slide along the platen roller 12 as guided by the guide shaft 20 and the guide rail 26.

Figure 8:
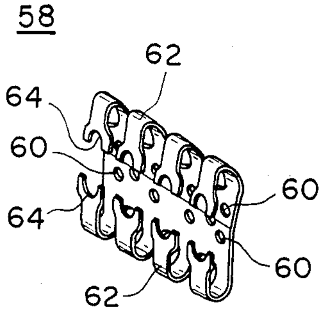
FIG. 8 is a perspective view showing the spring member 58 provided in the carriage 22.

At the open end of the carriage main body 44 is provided a front support plate 48 as bridging between the two legs of the main body 44. On the support plate 48 is fixedly mounted a mounting plate 50 by means of screws 52. The support plate 48 is provided with a plurality of small holes 54 directed toward and arranged along the platen roller 12. In the illustrated example, four such holes 54 are arranged spaced apart from one another in each of top and bottom rows extending in the direction parallel with the longitudinal axis of the platen roller 12. The support plate 48 is provided with a notch 56 at the center of its bottom thereby allowing a solenoid 66 to be partly received therein. A spring member 58 shown in FIG. 8 is fixedly attached to the support plate 48 by means of screws as best shown in FIG. 5. The spring member 58 is provided with a plurality (8 in the present embodiment) of holes 60 corresponding in position to the small holes 54 of the support plate 48 when the spring member 58 is mounted on the support plate 48 in position. As shown in FIG. 8, the spring member 58 also includes a plurality (8 in the present embodiment) of resilient arms 62 which are bent generally in the shape of "U". At the free end of each of the arms 62 is formed a holding notch 64. As will become apparent later, this holding notch 64 engages with the shoulder of a pen.

A solenoid 66 is fixedly attached to the mounting plate 50 by means of screws 68, 68. An actuator rod 70 is movably provided in the solenoid 66 with its base end projecting through a central hole 72 provided in the mounting plate 50. As best shown in FIG. 5, the base end of the actuator rod 70 comes into engagement with the free end of a leaf spring 74 whose base end is fixedly attached to the mounting plate 50 by means of a screw 76. As a result, the actuator rod 70, which is caused to move when the solenoid 66 is energized, is normally urged toward the tail end portion of the carriage main body 44.

A pen holding plate 78 is provided as fixedly attached to the carriage main body 44 at its closed or base end. As shown in FIG. 5, the holding plate 78 extends generally upright from the carriage main body 44, and it is provided with a plurality of large holes 80 (eight in the illustrated embodiment) as shown in FIG. 6. These large holes 80 are arranged in two rows, i.e., four in each row, as spaced from one another and directed toward the platen roller 12. It is to be noted that these large holes 80 correspond in position to the small holes 54 provided in the support plate 48. A stopper plate 82 is fixedly attached to the holding plate 78 by means of screws 84 and 84 at the side opposite to the side where the platen roller 12 is disposed. The stopper plate 82 is provided with a plurality (eight in the illustrated embodiment) of operating holes 86 corresponding in position to the large holes 80. As best shown in FIG. 6, it is to be noted that the operating hole 86 is somewhat smaller in diameter than the large hole 80, or the outer diameter of the base end portion of a pen 88. Thus, when the base end portion of pen 88 is slidingly fitted into the corresponding hole 80, the pen 8 comes into engagement with the stopper plate 82 thereby holding the pen 80 at its retracted position where the writing end of the pen 80 is located away from the platen roller 12. As best shown in FIG. 5, the pen 88 is comprised of a smaller diameter section whose one end is defined as a ball-point or writing end and a larger diameter section whose one end adjoining the other end of the smaller diameter section is defined as a shoulder. Thus, when the pen 88 is set in position, its base end of the larger diameter section is fitted into the corresponding large hole 80 and its smaller diameter section is fitted into the corresponding holes 60 and 54 with the shoulder of the pen in engagement with the holding notch 64 of the spring member 58. Thus, the pen 88 is normally urged against the stopper plate 82 at its retracted position due to the spring force of the corresponding resilient arm 62.

In the illustrated embodiment, eight such pens 88 are supported by the carriage 22. Under normal conditions, these pens 88 are held at their retracted positions so that their writing or ball-point ends are separated away from the platen roller 12 or recording paper placed thereon, so that no recording takes place even if the carriage 22 is moved. The pens 88 are arranged in two rows, top and bottom, in each of which four pens 88 are arranged as spaced apart from one another in a line parallel to the longitudinal axis of the platen roller 12. It is to be noted that as the pen 88 use may be made of any writing utensil, such as felt pen, ball-point pen, pencil and iron pen. Thus, a plurality of pens 88 same in kind but different in color may be mounted on the carriage 22 or a plurality of pens 88 different in kind may be mounted on the carriage 22, which may be used selectively.

Adjacent to the holder plate 78 is disposed a pair of actuating levers 90 and 92 which are pivotally supported by a common pivot shaft 94. As best shown in FIG. 7, the actuating lever 90 includes an actuating projection 96 at its top end, which may be brought into engagement with the base end of the pen 88 as passing through the operating hole 86 of the stopper plate 82. The actuating lever 90 has at its bottom end a horizontal bar 98 which extends horizontally so as to be operated by a bottom solenoid 100, as will be described more fully later. In the illustrated embodiment, the distance from the pivot shaft 94 to the actuating projection 96 is equal to the distance from the pivot shaft 94 to the horizontal bar 98. The actuating lever 90 is also provided with a pair of engaging projections 102, 102 generally at its center as extending toward the platen roller 12 thereby defining an engaging recess 104 therebetween. Besides, the lever 90 is provided with an elongated slot 106 as extending along the longitudinal direction of the lever 90 thereby allowing the other actuating lever 92 to be movably fitted in the slot 106. The lever 92 is shorter than the lever 90 and it is also provided with an actuating projection 108 at its top end, which may be brought into engagement with the base end of a selected one of the pens 88 in the bottom row through the operating hole 86. Moreover, the lever 92 is provided with a horizontal bar 110 at its bottom end, which may be operated by a top solenoid 112. In the illustrated embodiment, the actuating lever 92 is also so structured that the distance from the pivot shaft 94 to the projection 108 is equal to the distance from the pivot shaft 94 to the horizontal bar 110.

The solenoids 100 and 112 are fixedly attached to a supporting plate 114 which depends from the carriage main body 44. When the solenoids 100 and 112 are energized, their actuator rods 116 and 118 are advanced to be brought into engagement with the horizontal bars 98 and 110, respectively, thereby causing the respective actuating levers 90 and 92 to pivot around the shaft 94. Thus, the actuating projections 96 and 108 cause selected ones of pens 88 to be pressed against the platen roller 12. In the illustrated embodiment, since the distance from the pivotal point to the actuating projection is equal to the distance from the pivotal point to the horizontal bar in both of the actuating levers 90 and 92, the same solenoid may be used for solenoids 100 and 112 so that the pressure force applied to the platen roller 12 by any of the pens 88 may be maintained at constant.

The supporting plate 114 is fixedly attached to the carriage main body 44 by means of screws 120, together with a pair of engaging members 122, 122, each of which is provided with an engaging hole 124 to which one end of the driving wire 28 is fixedly attached. When the actuating lever 90 is mounted in position, the engaging recess 104 of the lever 90 comes into engagement with an engaging projection 128 of a clutch member 126, which is generally in the shape of "C" and which is formed with bird's beak elements 130, 130 at a cut-away portion which is opposite to the engaging projection 128. The clutch member 126 may be fitted onto the guide shaft 20 and is provided with a pair of grooves on its outer circumferential surface, into each of which is fitted a C-shaped spring 132 snappingly. Thus, the clutch member 126 is mounted on the guide shaft 20 as pressed by the C-shaped springs 132, 132; however, the clutch member 126 may be moved slidingly along the guide shaft 20 against a predetermined resistive force.

Also provided is a clutch operating member 134 which has a ridge 136 which may be inserted between the bird's beak elements 130, 130 of clutch member 126. The clutch operating member 134 has a pair of supporting arms 138, 138, each of which is provided with a through-hole 140. There is provided a supporting shaft 142 as extending between the two legs of the carriage main body 44 as extending through the holes 140, 140 so that the clutch operating member 134 is supported pivotally around the shaft 142. A coil spring 144 is also fitted onto the supporting shaft 142 with its one end engaged with the clutch operating member 134 and the other end engaged with a pin 146 planted in the carriage main body 44, so that the clutch operating member 134 is normally urged to rotate counterclockwise.

As described before, the tip end of the actuator rod 70 of solenoid 66 is pressed against the clutch operating member 134 under the force of leaf spring 74. It is to be noted that the force of leaf spring 74 is larger than the force of coil spring 144, so that the clutch operating member 134 is, in effect, urged to pivot clockwise in FIG. 7. As a result, the ridge 136 is inserted into the bird's beak elements 130, 130 of clutch member 126 thereby causing the clutch member 126 to open against the force of C-shaped springs 132, 132, so that the clutch member 126 is made freely movable along the guide shaft 20. Since the clutch member 126 and the actuating levers 90, 92 are supported on the carriage 44, the carriage 44 is also set freely movable along the guide shaft 20 when the clutch member 126 is made open or set in the decoupled state as described above. The clutch operating member 134 of the illustrated embodiment is provided with a plurality of positioning holes 148 along the ridge 136 as spaced apart from one another. These positioning holes 148 are provided corresponding in position to the pens 88 in each row and selectively engageable with the bird's beak elements 130, 130 of the clutch member 126 when the clutch member 126 is moved right and left along the ridge 136. Thus, the actuating levers 90 and 92 may be properly located to engage with one of the pens 88 selected for operation by having the bird's beak elements 130, 130 engaged with the corresponding one of the positioning holes 148.

With the plotter-printer constructed as described above, during power off, the leaf spring 74 pushes the actuator rod 70 forward and thus the clutch operating member 134 is caused to pivot clockwise in FIG. 7 against the force of the coil spring 144. As a result, the ridge 136 of clutch operating member 134 is pressed into the gap between the bird's beak elements 130, 130 so that the elements 130, 130 are moved away from each other against the force of C-shaped springs 132, 132. Thus, the clutch member 126 is decoupled from the guide shaft 20 thereby allowing the carriage 44 to move freely along the guide shaft 20. Accordingly, if the carriage 22 is pushed by a hand to move along the guide shaft 20, the clutch member 126 and the actuating levers 90 and 92 move together with the carriage main body 44.

Figure 9:
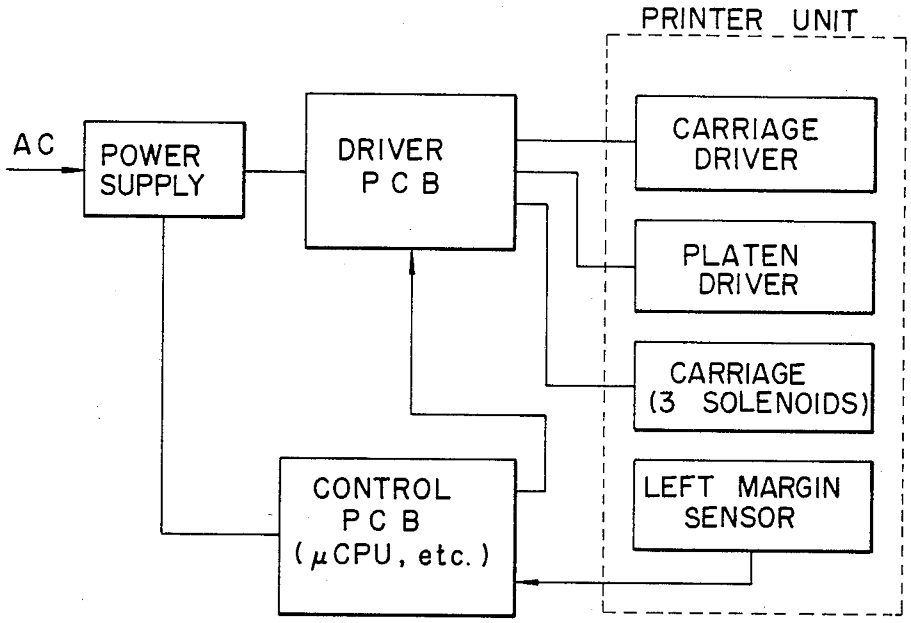
FIG. 9 is a block diagram showing the print control system for use in the plotter-printer of FIG. 2.
Figure 10:
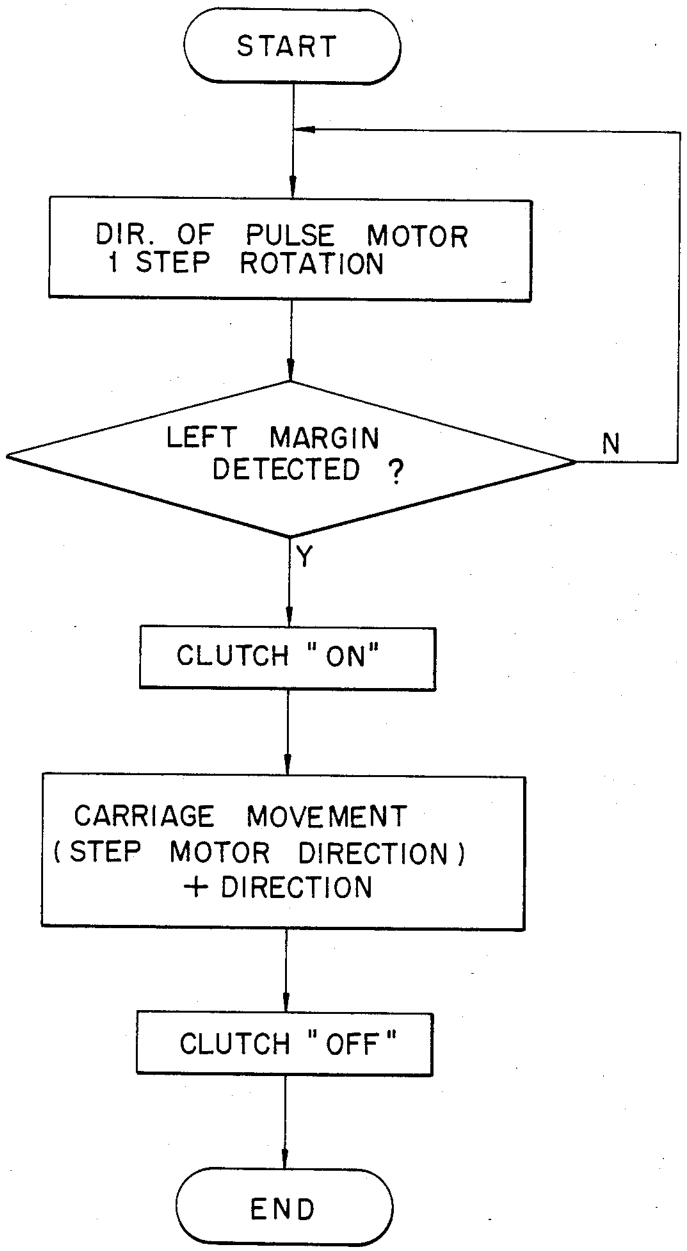
FIG. 10 is a flow chart showing the sequence of steps after power-up in the present plotter-printer.

FIG. 9 is a block diagram showing a print control system provided in the plotter-printer of FIG. 2. When a power supply is turned on, a signal from a control circuit is supplied to the carriage driving means 30 so that the pulse motor 34 is driven to rotate the pulley 32 thereby pulling the wire 28 to move the carriage 32 leftward (−direction) in FIG. 2. Thus, the carriage 22 moves along the platen roller 12 as guided by the guide shaft 20. As is obvious from a flow chart of FIG. 10, showing the sequence of steps of print operation in accordance with the present invention, when the sensor 38 detects that the carriage 22 has arrived at the leftmost position (left margin position in the present embodiment) after moving past the home position, the solenoid 66 is energized. Thus, the actuator rod 70 is forced to move against the force of leaf spring 74, so that the clutch operating member 134 pivots counterclockwise in FIG. 7 under the force of the coil spring 144. As a result, the ridge 136 is disengaged from the bird's beak elements 130, 130 of the clutch member 126. This causes the clutch member 126 to firmly grip the guide shaft 20 under the force of the C-shaped springs 132, 132 so that the clutch member 126 is coupled to the guide shaft 20.

At the same time, the carriage 22 is moved rightward (+direction) in FIG. 2. However, since the clutch operating member 134 is disengaged from the clutch member 126 and the clutch member 126 firmly grips the guide shaft 20, the actuating levers 90 and 92 engaged with the clutch member 126 remain unchanged in position. Then the carriage main body 44 comes into engagement with the actuating lever 90. However, in the illustrated embodiment, since the frictional resistance between the guide shaft 20 and the clutch member 126 is set to be larger than the torque of pulse motor 34, the carriage 22 continues to move by causing the actuating lever 90 to slide along the guide shaft 20. Then, upon detection of arrival at the home position by the sensor 36, the carriage 22 is stopped there, and at the same time the solenoid 66 is deenergized. Accordingly, the clutch operating member 134 is again brought into engagement with the clutch member 126 thereby causing the clutch member 126 to be decoupled from the guide shaft 20. As a result, the actuating levers 90 and 92 come to be located at the initial position which corresponds to the leftmost pen 88 and they are freely movable together with the carriage 22. Under the conditions, if either of solenoid 100 or 112 is energized to pivot the corresponding actuating lever 90 or 92 selectively, the corresponding pen 88 is pressed against the platen roller 12, so that desired information, such as graphs and characters, may be printed on the recording paper on the platen roller 12 by moving the carriage 22 while rotating the platen roller 12.

If it is desired to change pens 88 during printing operation, the solenoid 66 is energized to have the clutch operating member 134 disengaged from the clutch member 126 thereby causing the clutch member 126 to be coupled to the guide shaft 20. This allows the carriage 22 to move along the guide shaft 20 while keeping the actuating levers 90 and 92 remained motionless thereby changing the relative positional relation between the carriage 22 and the actuating levers 90 and 92. In this manner, the actuating levers 90 and 92 may be located at a position for operating a newly selected pen 88. At the same time, the carriage 22 and/or the platen roller 12 are operated to have the newly selected pen 88 located at a starting position of new printing on the recording paper. Then, similarly as described before, either the solenoid 100 or 112 is selectively energized and the carriage 22 is moved while rotating the platen roller 12, desired information may be printed on the recording paper with the newly selected pen 88.

In the above-described embodiment, use is made of a combination of the actuating levers 90, 92 and the solenoids 100, 112 as a common actuating means for selectively actuating a plurality of pens 88. However, other appropriate means such as cams known to one skilled in the art may also be used in place of the actuating levers 90, 92; moreover, use may also be made of other appropriate means such as electromagnets and motors in place of the solenoids 100, 112. Furthermore, in the above-described embodiment, in order to change the relative positional relation between the actuating levers 90, 92 and the pens 88, the carriage 22 is moved while maintaining the actuating levers 90, 92 motionless. However, it is to be noted that the present invention may also be so structured to move the actuating levers 90, 92 relative to the carriage 22 which is held motionless temporarily. Further, the pens 88 are provided in two rows in the above-described embodiment; however, the present invention should not be limited thereto and the pens 88 may be provided in a single row or three or more rows, as desired. As is also obvious for one skilled in the art, the solenoid 66 may be replaced by any other appropriate means, such as electromagnet and motor, which is capable of causing the clutch operating member 134 to pivot selectively.

Figure 1:
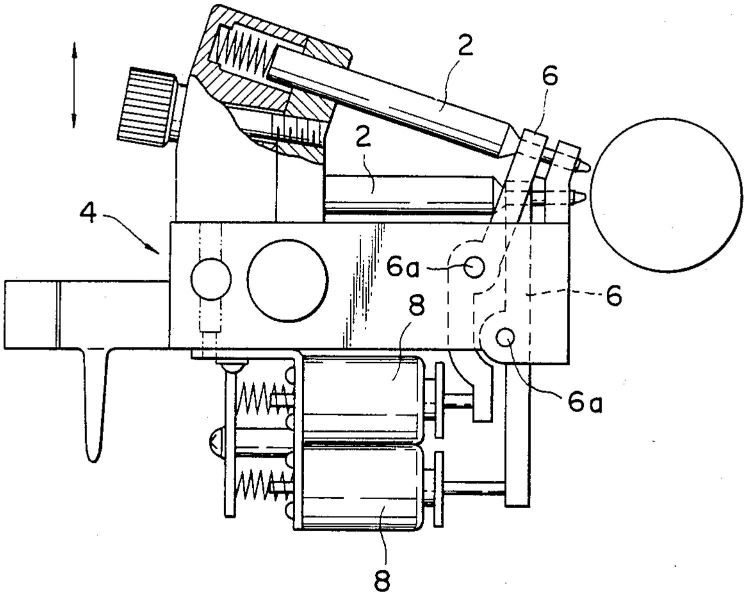
Fig. 1 Prior Art
FIG. 1 is a side elevational view, partly in cross-section, showing a carriage having mounted thereon a plurality of pens for use in a typical prior art plotter-printer.
Figure 11:
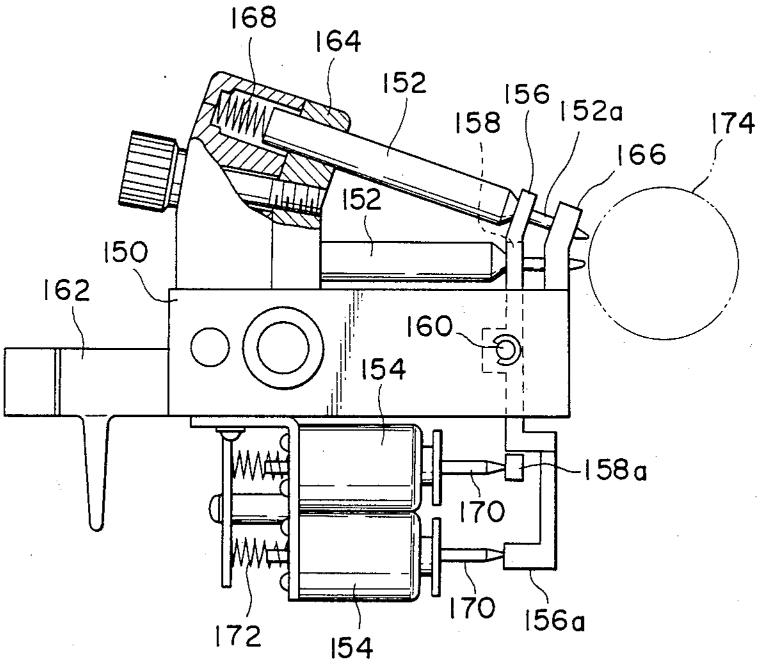
FIG. 11 is a side-elevational view showing the carriage having mounted thereon a plurality of pens and constructed in accordance with another embodiment of the present invention.

FIG. 11 shows a carriage assembly which is constructed in accordance with another embodiment of the present invention and which may be advantageously used in the plotter-printer of FIG. 2. As shown, this carriage assembly includes a plurality of pens 152 as arranged in a predetermined manner on a carriage main body 150, which is generally U-shaped as in the previous embodiment, and a like plurality of solenoids 154, one for each of the pens 152, which are fixedly attached to the carriage main body 150. However, as different from the prior art structure shown in FIG. 1, this carriage assembly includes only a pair of actuating levers 156 and 158 for selectively actuating the pens 152. It is to be noted that these actuating levers 156 and 158 are structurally similar to the paired actuating levers 90 and 92 of the previously described embodiment. Thus, the shorter actuating lever 158 is substantially housed in a slot (not shown) provided in the longer actuating lever 156. These actuating levers 156 and 158 are pivotally supported by a supporting shaft 160 which extends between two legs of the U-shaped carriage main body 150.

Although not shown specifically, the top end of each of the actuating levers 156 and 158 is provided with a holding notch in which a smaller diameter section **152*a* of the pen 152 may be fitted with the top end portion of each of the levers 156 and 158 in engagement with the shoulder of the pen 152 defined between its larger and smaller diameter sections. The carriage main body 150 is integrally formed with a rear holding plate 164 and a front holding plate 166, which are provided with holes of appropriate diameters into which the pens 152 may be fitted thereby arranging the pens 152 in position. A coil spring 168 is provided for each of the pens 152 in engagement with its base end surface so that the pens 152 are normally urged toward a platen roller 174**.

On the other hand, the actuating levers 156 and 158 have bottom ends **156*a* and 158*a* which are selectively engageable with actuator rods 170, 170 of bottom and top solenoids 154, 154. A coil spring 172 is provided for each of the solenoids 154 at the opposite side thereby normally applying a force tending to move the actuator rod 170 rightward in FIG. 11. It is to be noted that the force of spring 172 is chosen to be larger than the force of spring 168**.

Under the above-described condition, when the solenoids 154 are selectively energized, the actuator rod 170 is retracted against the force of the spring 172 so that the corresponding one of the actuating levers 156 and 158 is forced to pivot around the shaft 160 since the corresponding pen 152 is pushed forward under the force of the spring 168. Thus, the pen 152 comes to be pressed against the platen roller 174 so that desired information may be printed on the recording paper placed on the platen roller 174 with an appropriate printing pressure applied by the spring 168.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A plotter-printer comprising:

a platen;

a carriage main body supported to be movable along said platen;

driving means for driving to move said carriage main body along said platen in a reciprocating manner;

a plurality of writing utensils mounted on said carriage main body in a predetermined arrangement, each of said writing utensils being normally held at a retracted position where no printing takes place and capable of being located at an advanced position when actuated where printing is effected on a recording medium on said platen;

actuating means for actuating said writing utensils selectively thereby having a selected one of said writing utensils located at said advanced position;

control means for controlling a relative positional relation between said plurality of writing utensils and said actuating means thereby allowing said actuating means to actuate said selected one of said writing utensils in said predetermined arrangement; and a guide shaft which extends in parallel with said platen and on which said carriage main body is slidably supported wherein said actuating means is supported by said carriage main body as being relatively movable with respect thereto whereby said control means causes said actuating means to be temporarily motionless with respect to said guide shaft while said carriage main body moves along said guide shaft thereby changing the relative positional relation between said writing utensils mounted on said carriage main body and said actuating means.

2. The plotter-printer of claim 1 wherein said plurality of writing utensils are arranged as spaced apart from one another in a row parallel with the moving direction of said carriage main body.

3. The plotter-printer of claim 2 wherein said row is provided two or more as spaced apart from one another in a direction normal to said moving direction of said carriage main body, and said actuating means includes one actuating member for each of said rows for selectively actuating said writing utensils in the corresponding row.

4. The plotter-printer of claim 1 wherein said control means includes a clutch member which is in engagement with said actuating means and which can move freely along said guide shaft when in decoupled state and is fixed to said guide shaft at a predetermined friction therebetween in a coupled state, whereby said clutch member is temporarily fixed to said guide shaft to keep it motionless with respect to said guide shaft while said carriage main body moves along said guide shaft thereby changing the relative positional relation between said plurality of writing utensils and said actuating means.

5. The plotter-printer of claim 4 wherein said driving means includes a motor whose torque is larger than said predetermined friction between said guide shaft and said clutch member in coupled state.

6. A plotter-printer comprising:

a platen;

a guide shaft extending in parallel with said platen;

a carriage main body slidably supported on said guide shaft;

driving means for driving to move said carriage main body along said platen as guided by said guide shaft;

a plurality of writing utensils mounted on said carriage main body in a predetermined arrangement, each of said plurality of writing utensils being normally held at a retracted position where no printing takes place and advanced to an advanced position where printing takes place selectively when actuated;

at least one actuating lever pivotally supported on said carriage main body for actuating said plurality of writing utensils selectively;

first operating means for operating said at least one actuating lever to move corresponding one of said plurality of writing utensils to said advanced position;

a clutch member mounted on said guide shaft and engaged with said at least one actuating lever, said clutch member being selectively coupled to and decoupled from said guide shaft;

a clutch operating member engageable with said clutch member and supported by said carriage main body, said clutch operating member causing said clutch member to be coupled to said guide shaft when disengaged from said clutch member and to be decoupled from said guide shaft when engaged with said clutch member; and second operating means for operating said clutch operating member to be engaged with or disengaged from said clutch member.

7. The plotter-printer of claim 6 wherein said plurality of writing utensils are arranged spaced apart from one another in a row parallel with the moving direction of said carriage.

8. The plotter-printer of claim 7 wherein a plurality of said rows are provided spaced apart generally in a direction perpendicular to the moving direction of said carriage and a like plurality of said actuating levers are provided, one for each of said rows, whereby said first operating means is capable of operating said plurality of actuating levers independently from one another.

9. The plotter-printer of claim 8 wherein said first operating means includes a like plurality of solenoids, each of which is provided with an actuator rod engageable with corresponding one of said plurality of actuating levers.

10. The plotter-printer of claim 9 wherein each of said plurality of actuating levers pivotally supported by said carriage main body has a first end engageable with a selected one of said writing utensils arranged in the corresponding row and a second end engageable with said actuator rod of a selected one of said plurality of solenoids, whereby a distance from a pivotal point of said actuating lever to said first end is equal to a distance from said pivotal point to said second end.

11. The plotter-printer of claim 10 wherein said second end is provided with a horizontally extending portion of a predetermined length.

12. A plotter-printer comprising:
- a platen;
- a guide shaft extending in parallel with said platen;
- a carriage main body slidably supported on said guide shaft;
- driving means for driving to move said carriage main body along said platen as guided by said guide shaft;
- a plurality of writing utensils movably mounted on said carriage main body in a predetermined arrangement, each of said writing utensils being set in an operative position where printing takes place when actuated;
- actuating means provided on said carriage main body for actuating said plurality of writing utensils selectively;
- clutching means engaged with said actuating means thereby moving together along said guide shaft, said clutching means being capable of moving freely along said guide shaft in a decoupled state and clamped to said guide shaft with a frictional resistive force which is smaller than a driving force of said driving means in a couped state;
- clutch operating means which is normally engaged with said clutching means to set said clutching means in said decoupled state, said clutch operating means causing said clutching means to be set in said coupled state when activated;
- first control means for controlling said driving means to move said carriage main body to a first predetermined position in a path of movement of said carriage main body;
- second control means for controlling to activate said clutch operating means and to drive said driving means in a reversed direction thereby causing to move said carriage main body in a reversed direction upon detection of said carriage main body arriving at said first predetermined position; and
- third control means for controlling to terminate to drive said driving means thereby stopping the movement of said carriage main body and to deactivate said clutch operating means upon detection of said carriage main body arriving at a second predetermined position in said path of movement of said carriage main body.

13. The plotter-printer of claim 12 wherein said first predetermined position is a leftmost position in the path of movement of said carriage main body.

14. The plotter-printer of claim 13 wherein said second predetermined position is a home position in the path of movement of said carriage main body.

15. A plotter-printer comprising:
- a platen;
- carrying means supported to be movable along a predetermined path in parallel with said platen in a reciprocating manner;
- a first plurality of writing utensils mounted on said carrying means in a second plurality of parallel rows which are spaced apart from one another in a direction normal to said predetermined path along which said carrying means moves, each of said first plurality of writing utensils being normally located at a retracted position where no printing takes place and moved to an advance position where printing takes place when actuated;
- a second plurality of actuating levers pivotally supported on said carrying means, each of said actuating levers being capable of actuating a selected one of said writing utensils in a corresponding one of said rows; and
- control means for controlling the operation of said second plurality of actuating levers selectively.

16. The plotter-printer of claim 15 wherein said second plurality of actuating levers are pivotally supported by a common supporting shaft attached to said carrying means.

17. The plotter-printer of claim 16 wherein said second plurality of actuating levers are formed such that a shorter one is generally housed in a longer one.

* * * * *